United States Patent [19]

Vigeh

[11] Patent Number: 5,524,987
[45] Date of Patent: Jun. 11, 1996

[54] PLUGGED SLOTTED ENTRY BEARING

[75] Inventor: Majid H. Vigeh, Newbury Park, Calif.

[73] Assignee: Rexnord Corporation, Milwaukee, Wis.

[21] Appl. No.: 170,381

[22] Filed: Dec. 20, 1993

[51] Int. Cl.$^6$ .................................................. F16C 25/04
[52] U.S. Cl. .................................................. 384/209
[58] Field of Search .................................. 384/208, 206, 384/209, 207, 213

[56]  References Cited

U.S. PATENT DOCUMENTS

| | | | |
|---|---|---|---|
| 825,417 | 7/1906 | Rivett | 384/508 |
| 1,062,197 | 5/1913 | Stegeman . | |
| 1,853,727 | 4/1932 | Franks . | |
| 2,309,281 | 1/1943 | Steele | 287/88 |
| 2,345,564 | 4/1944 | Allen . | |
| 2,382,349 | 8/1945 | Taylor | 29/148 |
| 2,423,684 | 8/1947 | Collito . | |
| 2,478,660 | 8/1949 | Keahey . | |
| 3,116,539 | 1/1964 | Evans | 29/149.5 |
| 3,449,027 | 6/1969 | Bannister | 384/208 |
| 4,248,486 | 2/1981 | Bradley . | |
| 4,411,545 | 10/1983 | Roberge | 384/208 |
| 4,848,934 | 7/1989 | Blakely | 384/206 |
| 5,005,991 | 4/1991 | Heumann et al. | 384/208 |
| 5,073,038 | 12/1991 | O'Connell | 384/206 |
| 5,219,231 | 6/1993 | Sheedy | 384/206 |

FOREIGN PATENT DOCUMENTS

| | | |
|---|---|---|
| 2676260 | 11/1992 | France . |
| 861764 | 1/1953 | Germany . |
| 699252 | 11/1979 | U.S.S.R. . |
| 544879 | 7/1943 | United Kingdom . |

*Primary Examiner*—Lenard A. Footland
*Attorney, Agent, or Firm*—Michael, Best & Friedrich

[57]  ABSTRACT

Disclosed herein is a slotted entry ball and socket swivel bearing joint including an outer race member having a race axis and having an axially extending entry slot, an inner race member, and a plug which has an outer surface with a shape complementary to the shape of the entry slot, which is selectively inserted into the slot, and which has an inner concave surface that, when the plug is inserted in the slot, lines up with the race surface of the outer race member to complete the race surface of the outer race member.

10 Claims, 2 Drawing Sheets

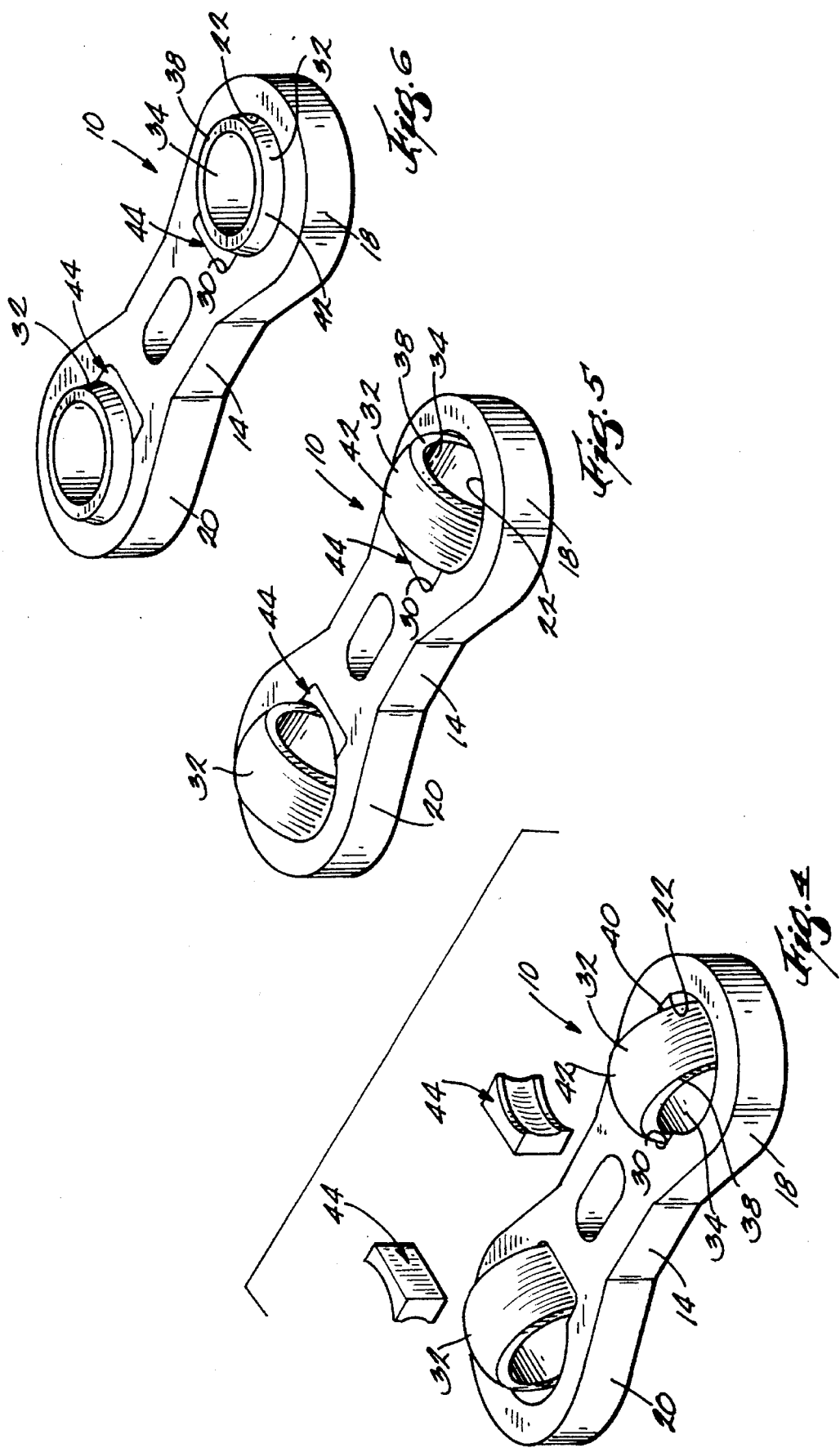

5,524,987

PLUGGED SLOTTED ENTRY BEARING

FIELD OF THE INVENTION

The invention relates generally to bearings and, more particularly, to slotted entry ball and socket swivel bearing joints.

BACKGROUND OF THE INVENTION

Slotted entry ball and socket swivel bearing joints having a pair of opposite entry slots are known in the art. See, for example, French publication No. 2,676,260, which is incorporated herein by reference. Link arm assemblies of the type including a link arm having a longitudinal axis, and having slotted entry ball and socket joints arranged along the longitudinal axis, at opposite ends of the link arm, are also known. See for example, U.S. Pat. No. 5,005,991, issued to Heumann et al. on Apr. 9, 1991, which is incorporated herein by reference. U.S. Pat. No. 5,005,991 illustrates a slotted entry ball and socket swivel joint wherein only one slot is provided for entry of the ball into the socket.

Typically, the balls or inner race members employed in such slotted entry bearing joints have a different hardness than the sockets or outer race members in which they are supported. When under high load, the outer race member deforms or stretches, and pinches the ball, thus causing a high coefficient of friction, lockup, and premature failure. The amount of load in a slotted entry bearing assembly is based on material strength and on the load direction.

SUMMARY OF THE INVENTION

The invention provides a slotted entry ball and socket swivel bearing joint including a plug which fills the slot to increase the load carrying capability of the bearing joint by adding area, and prevents the ball (inner race member) from dropping out of the socket (outer race member) prior to installation of a shaft or during handling of the bearing joint.

Other features and advantages of the invention will become apparent to those of ordinary skill in the art upon review of the following detailed description, claims, and drawings.

DESCRIPTION OF THE DRAWINGS

FIGS. 4–6 illustrate the steps involved in inserting the inner race member into the outer race member.

DETAILED DESCRIPTION OF THE PREFERRED EMBODIMENT OF THE INVENTION

Figure 1:
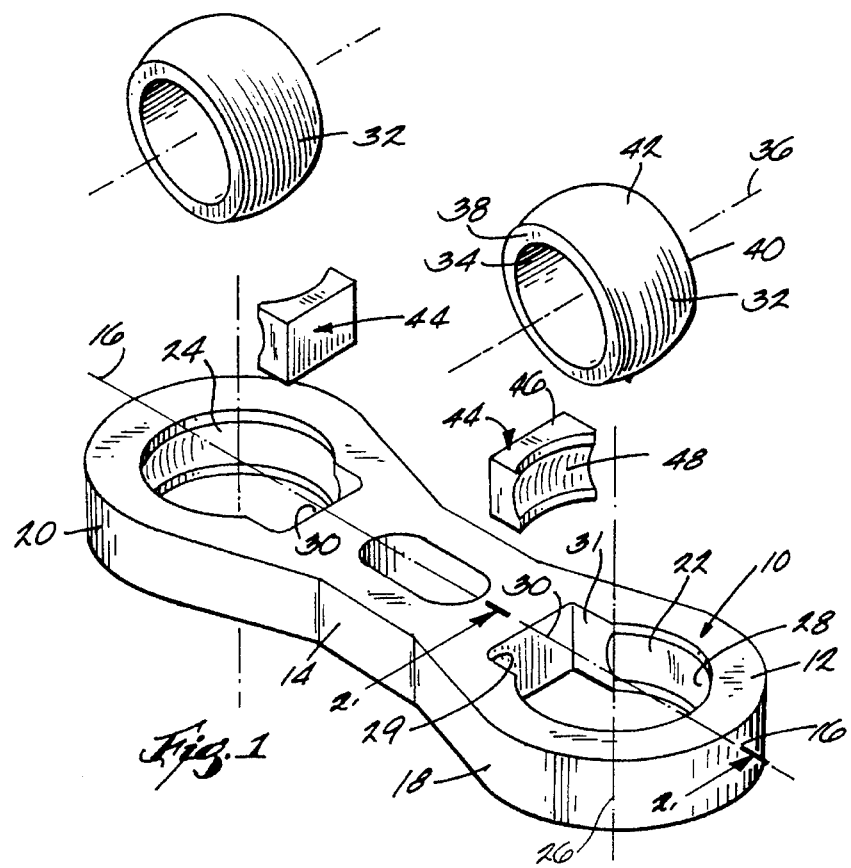
FIG. 1 is an exploded perspective view illustrating a bearing joint, including an inner race member and outer race member, and embodying various features of the invention.
Figure 2:
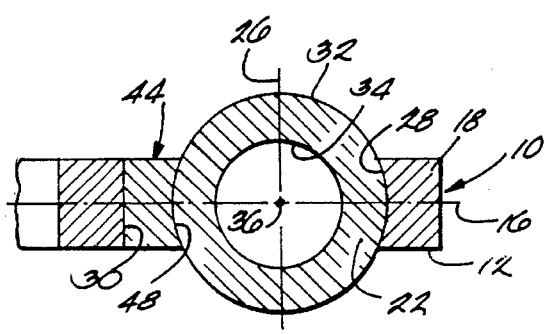
FIG. 2 is a sectional view taken along line 2—2 of FIG. 1.

Shown in the various figures is a bearing joint 10 embodying various features of the invention.

The bearing joint 10 includes an outer race member 12 which can have various configurations. In the illustrated embodiment, the outer race member 12 is a generally planar, elongated link arm 14 having a longitudinal axis 16, opposite ends 18 and 20, and respective openings 22 and 24 at each end 18 and 20, and along the longitudinal axis 16. The openings 22 and 24 define bearing race surfaces which will be described in more detail below. Such link arms have many applications including in aircraft, automobiles, gas turbine engines, and in various mechanical assemblies, for example. A swivel bearing joint 10 is defined at each of the openings 22 and 24. As the bearing joints 10 are identical in concept, only the one joint 10 at the end 18 will be described in detail herein. The outer race member 12 has a race axis 26 though the opening 22, perpendicular to the longitudinal axis 16, and the opening 22 defines an annulus presenting inwardly a race surface 28 which is spherically concave and extends about the race axis 26. The opening 22 in the outer race member 12 further includes an axially extending entry slot 30 which breaks the continuity of the race surface 28, which extends from the race surface 28 along the longitudinal axis 16 toward the opening 24, and which has opposite parallel planar sides 29 and 31. The outer race member 12 is made of any suitable material. For example, the outer race member 12 can made from a metal such as 17- 4PH, 15-5PH, 13-8MO, A286, or Inconel/718. Alternatively, the outer race member 12 can be made of a ceramic material or a composite material. The outer race member 12 could be a plain race member, or a three, four, or more ball housing.

The joint further includes a ball or inner race member 32 which is selectively inserted into the outer race member 12 via the slot 30. The inner race member 32 is made of any suitable material. For example, the inner race member 32 can made from a metal such as stellite 6, beryllium copper, aluminum nickel bronze, 718, 440C, or 52100. Alternatively, the inner race member 32 can be made of a ceramic material or a composite material.

The shape of the illustrated inner race member 32 can be described as follows, it being kept in mind that the inner race member 32 of the illustrated embodiment can be manufactured by machining or any other process that produces the illustrated shape. Consider a sphere having therethrough a bore which bore has an axis passing through the sphere. Now consider cutting away end portions of the sphere, along planes that are parallel to one another and that are perpendicular to the axis of the bore, so as to define an oblate spheroid having parallel spaced apart planar circular surfaces respectively surrounding the bore. The inner race member 32 of the illustrated embodiment has the shape just described, and includes a bore 34 having an axis 36, opposite planar circular end portions 38 and 40 lying along respective planes perpendicular to the axis 36, and an outer generally spherical convex surface 42, complementary to the concave spherical surface of the race surface 28 of the outer race member 12 and closely fitting the race surface 28 of the outer race member 12 for free rotation in the race surface 28 of the outer race member 12, the outer convex surface 42 extending between the circular end portions 38 and 40. The inner race member 32 has a thickness between end portions 38 and 40. The axis 36 of the bore 34 is also the axis of the inner race member.

The slot 30 has a width, between sides 29 and 31, which is at least slightly greater than the thickness dimension of the inner race member between surfaces 38 and 40 and such that the slot 30 in the outer race member 12 permits insertion of the inner race member 32 into the outer race member 12 when said inner race member 32 is oriented with its bore axis 36 perpendicular to the race axis 26 of the outer race member 12 and perpendicular to the longitudinal axis 16 (see FIG. 4).

The joint 10 further includes a plug 44 which has an outer surface 46 with a shape complementary to the shape of the slot 30, which is selectively inserted into the slot 30, and which has an inner concave surface 48 that, when the plug 44 is inserted in the slot 30, lines up with the race surface 28 of the outer race member 12 to complete the race surface in the outer race member 12 through 360° about the race axis 26. The plug 44 is preferably made of the same material as the outer race member 12.

Figure 3:
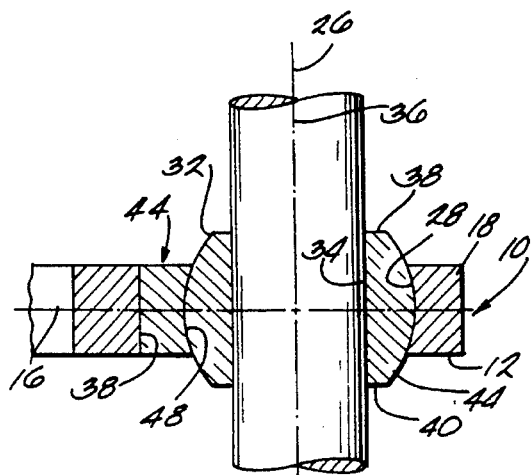
FIG. 3 is a view similar to FIG. 2 but showing the inner race member of the bearing joint rotated 90° to accept a shaft.

The inner race member 32, after its insertion into the slot 30, is rotated 90° about the race axis 26 of the outer race member 12 to permit insertion of the plug 44 into the slot 30 (see FIG. 5). After the plug 44 has been inserted into the slot 30, the inner race member 32 is rotated (about an axis which is perpendicular to the longitudinal axis 16 and which is perpendicular to the race axis 26 of the outer race member 12) to an operational position to accept a shaft (see FIGS. 3 and 6). This results in the plug 44 being locked into the slot 30 and further results in the inner race member 32 being locked into the outer race member 12. When the inner race member 32 is in the operational position, it is freely rotatable in the outer race member 12. After a shaft is inserted into the inner race member 32, the inner race member 32 cannot be turned to bring the axis 36 of its bore 34 transverse to the race axis 26 of the outer race member 12 because the shaft will not permit the inner race member 32 to be turned in this manner.

The use of the plug 44 increases the load bearing area, and thus the load carrying capability, of the bearing joint 10 and prevents the inner race member 32 from dropping out of the outer race member 12 prior to installation of a shaft or during handling of the bearing joint 10.

Thus, the invention provides a bearing joint including a plug which increases the load carrying capability of the bearing joint, and prevents the inner race member from dropping out of the outer race member prior to installation of the shaft or during handling of the bearing joint.

While a preferred embodiment of the invention has been described, various modifications are possible. For example, the outer bearing race of the bearing joint need not be in an arm that defines two outer bearing races. Thus, the scope of the invention is to be limited only by the scope and spirit of the following claims.

I claim:

1. A slotted entry ball and socket swivel bearing joint comprising an outer race member having spaced apart opposite sides, an annulus having an axis and extending between said sides and including an inwardly facing, spherically concave race surface, and an entry slot which breaks the continuity of said race surface, a one-piece inner race member having a pair of parallel, spaced apart circular end surfaces, an outer convex surface which extends from and between said circular end surfaces, which is complementary to the concavity of said race surface, and which closely fits said race surface for free rotation in said race surface, and a bore which has an axis and which extends from and between said end surfaces, and a plug which is insertable into said slot and which includes an outer surface having a shape complementary to the shape of said entry slot, and an inner concave surface which, when said plug is inserted into said entry slot, lines up with said race surface of said outer race member to complete said race surface of said outer race member, and which prevents removal of said inner race member from said outer race member when said axis of said annulus and said bore are substantially parallel.

2. A slotted entry ball and socket swivel bearing joint in accordance with claim 1 wherein said entry slot extends on both sides of a radial line extending from said axis of said annulus and includes side surfaces spaced from said radial line at a distance at least as great as the spacing of said opposite end surfaces of said inner race member, wherein said inner race member is enterable into said annulus and said entry slot when said plug is not in said entry slot and when said inner race member is inserted with said opposite sides thereof extending in generally parallel relation to said radial line, wherein, when said inner race member is inserted with said opposite sides thereof extending in generally parallel relation to said radial line, said inner race member is thereafter rotatable within said race surface until one of said end surfaces is located in facing relation to said entry slot, wherein, when said one of said end surfaces of said inner race surface is located in facing relation to said entry slot, said plug is thereafter enterable into said entry slot to complete said race surface, wherein, when said plug is entered into said entry slot to complete said race surface, said inner race member is thereafter rotatatble in said race surface to a position wherein said axis of said bore is coincident with said axis of said annulus, and wherein, when said axis of said annulus and said axis of said bore are coincuident, said inner race member is thereafter retained against removal thereof from said outer race member.

3. A slotted entry ball and socket swivel bearing joint as set forth in claim 1 herein the planar circular surfaces are of the same size.

4. A slotted entry ball and socket swivel bearing joint as set forth in claim 1 wherein the plug is selectively insertable into the axially extending entry slot when the inner race member is in the outer race member and is oriented with the bore axis of the inner race member perpendicular to the race axis of the outer race member and with one of the planar surfaces of the inner race member facing the slot.

5. A slotted entry ball and socket swivel bearing joint as set forth in claim 4 wherein, when the inner race member is oriented other than with one of the planar surfaces facing the slot, the plug cooperates with the outer race member to prevent the inner race member from falling out of the outer race member.

6. A slotted entry ball and socket swivel bearing joint in accordance with claim 1 wherein said inner race member is an oblate spheroid.

7. A slotted entry ball and socket swivel bearing joint in accordance with claim 1 wherein said end surfaces of said inner race member are planar, wherein said entry slot extends on both sides of a radial line extending from said axis of said annulus and includes side surfaces spaced from said radial line at a distance at least as great as the spacing of said end surfaces of said inner race member, and wherein said inner race member has a thickness between said end surfaces which is less than the dimension between said sides of said slot such that said inner race member can be inserted into said slot with said circular surfaces in adjacent relation to said sides of said entry slot.

8. A slotted entry ball and socket swivel bearing joint in accordance with claim 1 wherein said slot extends from and between said sides of said outer race.

9. A slotted entry ball and socket swivel bearing joint comprising an outer race member having spaced apart opposite sides, an annulus having an axis and extending between said sides and including an inwardly facing, spherically concave race surface, and an entry slot which breaks the continuity of said race surface and which extends from and between said sides of said outer race and on both sides of a radial line extending from said axis of said annulus and includes side surfaces spaced from said radial line at a distance, and a one-piece inner race member which is in the form of an oblate spheroid and which includes a pair of parallel, spaced apart planar circular end surfaces, a thickness between said end surfaces which is less than the distance between said sides of said entry slot such that said inner race member can be inserted into said slot with said circular surfaces in adjacent relation to said sides of said entry slot, an outer convex surface which extends from and between said circular end surfaces, which is complementary to the concavity of said race surface, and which closely fits said race surface for free rotation in said race surface, and a bore which has an axis and which extends from and between said end surfaces, and a plug which is insertable into said slot and which includes an outer surface having a shape complementary to the shape of said entry slot, and an inner concave surface which, when said plug is inserted into said entry slot, lines up with said race surface of said outer race member to complete said race surface of said outer race member, and which prevents removal of said inner race member from said outer race member when said axis of said annulus and said bore are coincident.

10. A slotted entry ball and socket swivel bearing joint in accordance with claim 9 wherein said entry slot extends on both sides of a radial line extending from said axis of said annulus and includes side surfaces spaced from said radial line at a distance at least as great as the spacing of said opposite end surfaces of said inner race member, wherein said inner race member is enterable into said annulus and said entry slot when said plug is not in said entry slot and when said inner race member is inserted with said opposite sides thereof extending in generally parallel relation to said radial line, wherein, when said inner race member is inserted with said opposite sides thereof extending in generally parallel relation to said radial line, said inner race member is thereafter rotatable within said race surface until one of said end surfaces is located in facing relation to said entry slot, wherein, when said one of said end surfaces of said inner race surface is located in facing relation to said entry slot, said plug is thereafter enterable into said entry slot to complete said race surface, wherein, when said plug is entered into said entry slot to complete said race surface, said inner race member is thereafter rotatable in said race surface to a position wherein said axis of said bore is coincident with said axis of said annulus, and wherein, when said axis of said annulus and said axis of said bore are coincuident, said inner race member is thereafter retained against removal thereof from said outer race member.

* * * * *